United States Patent
Karabelas et al.

(10) Patent No.: US 8,808,539 B2
(45) Date of Patent: Aug. 19, 2014

(54) INTEGRATED SYSTEM FOR MONITORING PERMEATE QUALITY IN WATER TREATMENT FACILITIES

(75) Inventors: Anastasios J. Karabelas, Kalamaria (GR); Ioannis Gragopoulos, Thessaloniki (GR); Nicos P. Isaias, Nicosia (CY)

(73) Assignee: Saudi Arabian Oil Company (SA)

( * ) Notice: Subject to any disclaimer, the term of this patent is extended or adjusted under 35 U.S.C. 154(b) by 475 days.

(21) Appl. No.: 12/786,147

(22) Filed: May 24, 2010

(65) Prior Publication Data

US 2011/0284480 A1    Nov. 24, 2011

(51) Int. Cl.
| | | |
|---|---|---|
| *B01D 63/12* | (2006.01) | |
| *B01D 61/08* | (2006.01) | |
| *B01D 61/10* | (2006.01) | |
| *C02F 1/44* | (2006.01) | |
| *B01D 61/12* | (2006.01) | |
| *B01D 65/10* | (2006.01) | |

(52) U.S. Cl.
CPC .............. *B01D 61/12* (2013.01); *B01D 61/10* (2013.01); *C02F 1/44* (2013.01); *C02F 2209/02* (2013.01); *C02F 2209/05* (2013.01); *C02F 2209/03* (2013.01); *B01D 2313/90* (2013.01); *B01D 2311/243* (2013.01); *C02F 2209/006* (2013.01); *C02F 1/441* (2013.01); *C02F 1/442* (2013.01); *B01D 65/10* (2013.01); *B01D 2311/16* (2013.01)

USPC .. 210/321.65; 210/652; 210/650; 210/321.76; 210/321.74; 210/321.85; 210/321.83

(58) Field of Classification Search
None
See application file for complete search history.

(56) References Cited

U.S. PATENT DOCUMENTS

| | | |
|---|---|---|
| 4,409,849 A | 10/1983 | Roos |
| 6,001,254 A | 12/1999 | Espenan et al. |
| 6,190,556 B1 | 2/2001 | Uhlinger |
| 6,506,306 B1 | 1/2003 | Hammer et al. |
| 6,609,070 B1 | 8/2003 | Lueck |
| 2005/0224412 A1 | 10/2005 | Best et al. |
| 2005/0263444 A1 | 12/2005 | Baca et al. |
| 2006/0144765 A1 | 7/2006 | Skwiot |
| 2007/0209977 A1 | 9/2007 | Wilf et al. |
| 2008/0105038 A1 | 5/2008 | Jons et al. |
| 2008/0230476 A1 | 9/2008 | Gilron et al. |
| 2008/0289403 A1 | 11/2008 | Palacios Donaque |
| 2008/0314807 A1 | 12/2008 | Junghanns et al. |

OTHER PUBLICATIONS

International Search Report and Written Opinion issued in PCT Application No. PCT/US11/37175, dated May 19, 2011 (10 pages).

*Primary Examiner* — Krishnan S Menon
(74) *Attorney, Agent, or Firm* — Bracewell & Giuliani LLP; Constance G. Rhebergen

(57) ABSTRACT

The invention provides a method and apparatus for continuous monitoring of permeate from membrane elements in a water treatment plant, including a desalination plant. The apparatus includes a probe that includes multiple sensors such that at least one sensor is associated with each membrane element. Each sensor is coupled to a node, which is configured to communicate a signal associated with the permeate quality to a central node sink. The node may communicate wirelessly with the node sink.

19 Claims, 3 Drawing Sheets

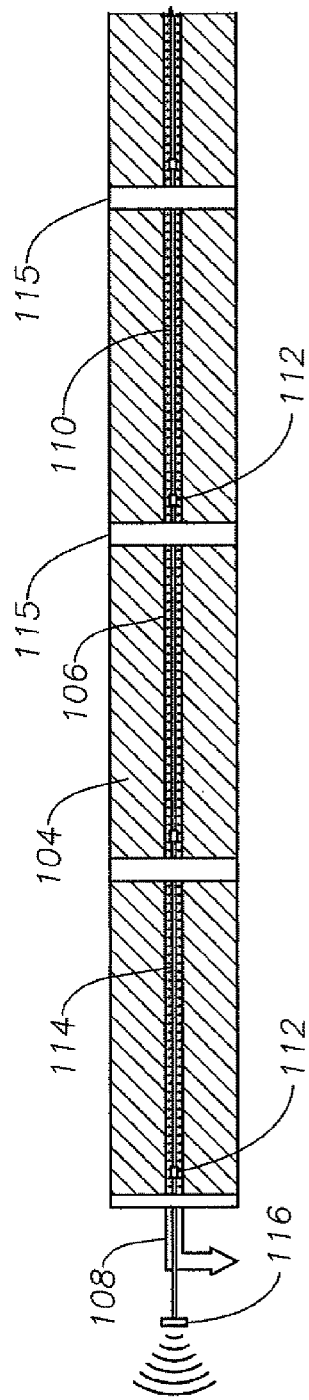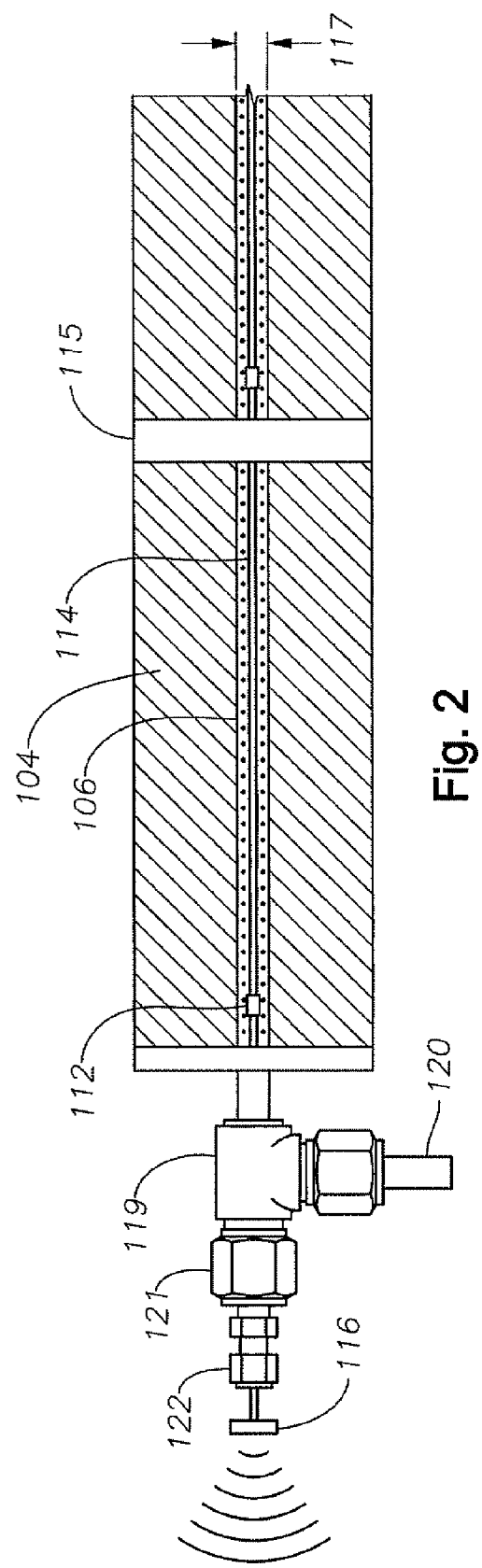

INTEGRATED SYSTEM FOR MONITORING PERMEATE QUALITY IN WATER TREATMENT FACILITIES

FIELD OF THE INVENTION

The invention relates to a method and apparatus for monitoring permeate quality in a water treatment process. More specifically, the invention relates to a method and apparatus for monitoring the performance of individual membrane elements in a reverse osmosis or nanofiltration desalination of a water treatment plant.

BACKGROUND OF THE INVENTION

Water treatment plants, including desalination plants, generally consist of numerous filtration vessels, where each vessel typically includes multiple spiral wound membrane elements. Generally, water treatment refers to processes that make water more acceptable for a desired end use. Frequently, the desired end use is human consumption; however, other water treatment processes are designed to provide water suitable for industrial processes, medical use, the recycle of water into the environment, and the like.

Exemplary brackish water and/or sea-water membrane desalination plants typically include numerous vessels, with each vessel typically containing 6-8 individual spiral wound membrane elements. A medium sized 10,000 m$^3$/day desalination plant operating with an average flux of approximately 20 L/m$^2$h, wherein each vessel includes six 8-inch membrane elements, will require approximately 116 vessels, and a total of nearly 700 membrane elements. Larger desalination plants, such as plants having a capacity of up to 330,000 m$^3$/day, can require a total of more than 40,000 membrane elements. As would be expected, the quality of the overall permeate from the desalination plant depends upon the performance of each individual membrane element. Due to the large number of total membrane elements, for example 700 or more than 40,000 membrane elements, as mentioned above, the monitoring of the performance of the individual membrane elements is both very important and very difficult. The inability to closely monitor the performance of individual membrane elements can lead to premature replacement of individual membrane elements (i.e., replacement of the membrane element before the performance and corresponding water quality has degraded) or the failure to replace membrane elements when needed, can lead to increased operating expenses and poor performance (i.e., reduced quality of processed water), respectively.

Current methods for monitoring membrane element performance in a water treatment plant typically include the individual probing each vessel, a process that is both time consuming and costly. The process of individually testing each membrane element in an entire plant consisting of numerous vessels and membrane elements can take days, or even weeks, depending on the size of the plant. Furthermore, by the time the measurements have been completed, the plant conditions may have changed as compared to the conditions when testing started. Thus, there exists a great need for a novel integrated method and system that provides for the preferably rapid monitoring of individual membrane elements and means for communicating data relating to each membrane element to a central location.

SUMMARY

The invention provides a method and apparatus for monitoring the performance of individual membrane elements in a plurality of filtration vessels in a water treatment plant, including a desalination plant that includes multiple filtration vessels.

In one aspect, a system for monitoring performance of membrane elements in a water treatment facility, including a water desalination plant, is provided. The system includes at least one vessel that contains a plurality of membrane elements. The plurality of membrane elements are operable to remove salt from a water source that contains salt or other dissolved species, and produce a permeate flow of filtered water. The membrane element includes a filter medium and a permeate collection tube positioned in the membrane element, which is operable to receive the permeate flow and comprising a permeate outlet. The system further includes a probe positioned within the permeate collection tube and operable to measure a physical property of the permeate, wherein the probe includes at least one sensor, and wherein the at least one sensor is positioned within the permeate collection tube adjacent to at least one membrane element. The system includes at least one node electronically coupled to the probe, wherein the node is operable to receive signals from the at least one sensor corresponding to a pre-selected physical property of the permeate flow. The system also includes a communications node configured to receive the signal from the at least one node, wherein the communications node is configured to process and compare the signal against a pre-determined value corresponding to the performance of a membrane element.

In certain embodiments, the node includes at least one processor, at least one impedance analyzer, and at least one transceiver. In certain embodiments, the physical property of the permeate flow that is measured is the conductivity of the permeate flow. In alternate embodiments, the physical properties of the permeate flow that can be measured include the temperature and conductivity of the permeate flow. In certain embodiments, the system includes at least one sensor adjacent to each membrane element.

In another aspect, a method for monitoring performance of a membrane element in a water treatment plant, including an plant for water desalination, is provided. The method includes the steps of (a) injecting water containing salt or other dissolved species into a vessel at an injection pressure, wherein the vessel includes at least one membrane element and a permeate collection tube positioned within said membrane element, wherein the permeate collection tube is adapted to receive a filtered permeate flow through said membrane element; (b) measuring a property of the permeate flow in the membrane element with a sensor to produce an electronic signal, wherein at least one sensor is positioned adjacent to the membrane element such that at least one sensor contacts the permeate flow exiting the membrane element and measures the property thereof, wherein the property can be selected from conductivity and temperature; (c) communicating an electronic signal from the sensor to a node, said electronic signal including information corresponding to the location of the sensor within the vessel, said node processing the electronic signal from the sensor to provide a processed signal; (d) electrically or wirelessly communicating the processed signal from the node to a node sink; and (e) receiving the processed signal, by the node sink, wherein the node sink is operable to receive processed signals from a plurality of nodes corresponding to the performance of associated membrane elements.

In another aspect, a system for determining and evaluating membrane element performance in a water treatment facility, including a desalination plant is provided. The step of evaluating membrane performance can include determining whether the membrane element is in need of replacement, remaining operable lifetime of the membrane element, or providing a qualitative or quantitative measure of the quality of a permeate flow through the membrane element. The system includes at least one vessel, wherein the vessel includes a plurality of membrane elements, a permeate collection tube positioned within the plurality membrane elements and a probe positioned within the permeate collection tube. The permeate collection tube is operable to receive a filtered permeate flow through the membrane element. The probe includes at least one sensor positioned adjacent to at least one membrane element, wherein the at least one sensor is operable to measure a physical property of the filtered permeate flow exiting from a corresponding membrane element to which it is adjacent, wherein the physical property is selected from the group consisting of conductivity and temperature. The sensor is also operable to communicate a signal corresponding to the conductivity of the permeate flow to a vessel node. The vessel node is configured to receive and process the signal from the at least one sensor to produce a processed signal. The step of processing the signal can include normalizing and/or correcting the measured value corresponding to the physical property, and can include the step of correlating the physical property value to a specific sensor, membrane element, and/or vessel. The system further includes a communication node electronically coupled to the vessel node, wherein the communications node is operable to receive the processed signal from the node and operable to transmit the processed signal. The system also includes a first computer configured to receive the processed signal from the communication node, wherein the processed signal corresponds to the physical property measurement taken at a specific membrane element. The system also includes a computer program that is associated with the computer and stored on a tangible computer memory media. The computer program is operable on the computer, the computer program including a set of instructions that, when executed by the computer, cause the computer to perform a set of operations. The operations performed by the computer include receiving the processed signal from the communication node associated with the vessel, where the processed signal corresponds to the measured physical property of the filtered permeate flow, and determining, by the computer responsive to receiving the processed signal, whether the processed signal is different than a predetermined value. The predetermined value corresponds to a threshold performance level of the membrane element, and a processed signal value that is different than the predetermined value can be indicative of a need to replace the membrane element; the signal identifying the location of the sensor and the associated membrane element from which the permeate flow is measured. The operation performed by the computer further includes communicating a need to replace the membrane element, by the computer to an operator of the water treatment facility.

In another aspect, a computer program product stored on a tangible computer memory media, and operable on a computer, is provided. The computer program product includes a set of instructions that, when executed by the computer, cause the computer to perform the following operations. The computer receives a signal from a communication node in a water treatment facility that includes a plurality of vessels, such as water treatment vessel. Each vessel includes a plurality of membrane elements and a permeate collection tube located within said plurality of membrane elements. The permeate collection tube is operable to receive a filtered permeate flow, and includes a probe positioned therein. The probe includes at least one sensor positioned adjacent to each of the plurality of membrane elements, which is configured to measure a physical property, such as conductivity or temperature, of the permeate flow at the sensor location. Responsive to the receipt of the signal by the computer, the computer program determines if the signal is different than a predetermined value, wherein the predetermined value is a threshold measure of the point at which the membrane element is in need of replacement. Responsive to a determination by the computer that the signal is different than the predetermined value, the computer program communicates to an operator at the water treatment facility that a membrane element in a water treatment facility needs to be replaced.

BRIEF DESCRIPTION OF THE DRAWINGS

FIG. 1 shows a schematic of a filtration vessel according to one embodiment of the present invention.

FIG. 2 shows a schematic of a filtration vessel according to another embodiment of the present invention.

DETAILED DESCRIPTION OF THE INVENTION

Figure 3:
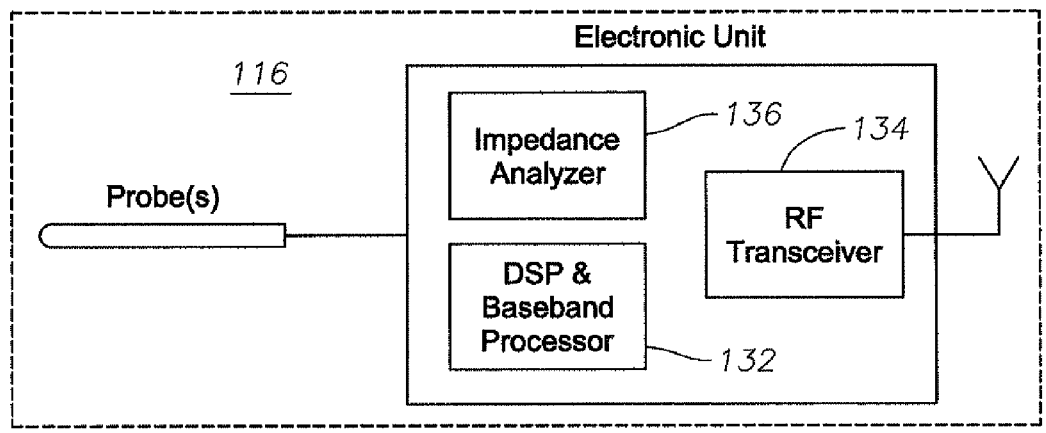
FIG. 3 shows a schematic view of a node according to one embodiment of the present invention.

Although the following detailed description includes many specific details for purposes of illustration, it is understood that one of ordinary skill in the art will appreciate that the examples, variations and alterations of the following details are within the scope and spirit of the invention. Accordingly, exemplary embodiments of the invention described herein are set forth without any loss of generality to, and without imposing limitations on, the claimed invention.

Generally, two factors determine performance of membrane elements in a desalination process: selectivity and productivity. Selectivity generally relates to retention or separation, i.e., the exclusion of certain species based upon size or type. Productivity is generally expressed as flux, expressed in terms of $L/m^2h$. Nano filtration and reverse osmosis are two membrane based techniques that are commonly used to remove salts from water, and these techniques generally operate on the principle that separation takes place based upon diffusion through the membrane. Nano filtration and reverse osmosis processes are meant to remove dissolved solids (salts) only. Generally, these processes require higher pressure and have lower productivity than do traditional techniques employed to remove suspended particles, such as micro filtration and ultra filtration.

Provided herein is a system and method for the continuous monitoring of individual or groups of individual membrane elements in a desalination or water treatment plant, and is applicable for reverse osmosis and nano filtration operations.

Referring to FIG. 1, a cross-section view of a portion of the water treatment vessel 102, including probe 110 according to the present invention, is provided. Vessel 102, also referred to herein as a filtration vessel, is preferably cylindrical in shape. Probe 110 can include a plurality of sensors 112 and is removably installed and positioned within each vessel 102. Each vessel 102 includes at least one membrane element 104 that is designed to allow water flow through the membrane while dissolved salts, minerals and other substances present in the water are retained, thereby preventing those substances from flowing though with the water. In this manner, a filtered and/or purified water product or permeate flow can be provided. The addition of sensors 112 positioned within each vessel 102 does not disturb or inhibit normal operation of the vessel, or the permeate flow therefrom.

Each vessel 102 preferably includes a plurality of membrane elements 104 connected in series. Membrane element 104 includes a permeate collection tube 106 positioned at or near the center of the permeate membrane and extending therethrough. Generally, vessel 102 and membrane element 104 are cylindrical in shape. As multiple membrane elements 104 can be connected in series, the permeate collection tubes 106 extending through the membrane elements are then in fluid connection with each other. In embodiments that include more than one membrane element 104, the individual membrane elements can be separated by spacer arrangement 115. In a preferred embodiment, permeate collection tube 106 is perforated.

Referring to FIG. 2, one end of vessel 102 can include permeate exit pipe or outlet 108, which can be connected to a coupling 119, such as a T-fitting. Coupling 119 can include an entry point configured to allow one or more removable probes 110 to be inserted into the permeate collection tube 106. The entry point for insertion of the probe 110 can have an inner diameter that is larger than the outer diameter of the probe, thereby allowing for the probe to be installed and removed from vessel 102 though the entry point. Alternatively, probe 110 can include a compressible structure, whereby the probe may have an outer diameter that is greater than the inner diameter for the entry point of coupling 119, and wherein the probe is compressible to an outer diameter that is less than the inner diameter of the entry point during insertion. Following insertion of an exemplary probe 110 having a compressible structure, the structure can extend, preferably ensuring placement of the probe within the tube 106. Coupling 119 can also include permeate collection exit 120, which allows for the permeate to be removed from vessel 102. During installation, probe 110 is removably positioned within permeate collection tube 106. Probe 110 includes one or more sensors 112, connected by tubular members 114, which are preferably positioned such that at least one sensor is adjacent to each membrane element 104. Node 116 is electronically coupled to each sensor 112, and is positioned external to vessel 102 on probe mount 122.

Fitting 119, which can be, for example, a "T" type fitting, is connected to permeate exit pipe 108. One end of fitting 119 can include a water tight fitting 121, which can be used for installation of probe 110. In this embodiment, wherein water tight fitting 121 is employed to assist with the installation of probe 110, the water tight fitting can be positioned inline with permeate exit pipe 108 and permeate collection tube 106. Fitting 119 can be any shape that includes a pathway that is aligned with permeate collection 106, thereby allowing probe 110 to be installed within the vessel 102.

Node 116 can be configured to receive and process electronic signals received from sensors 112. Additionally, node 116 can be configured to transmit data relating to the electronic signals received from sensors 112 to a central receiving computer or like device. Node 116 is positioned at one end of vessel 102, although in certain embodiments, vessel 102 can include two or more nodes, wherein at least one node is positioned at an end of the vessel. Alternatively, in embodiments where vessel 102 includes two or more nodes 116, the nodes can be positioned such that each end of the vessel includes at least one node. The second node can be redundant for the first node, or the second node may measure and communicate a different measurement than the first node. Communication of the electronic signal from the sensor 110 to the node 116 is typically through a wired connection, wherein each sensor is coupled to distinct wires.

In operation, a water treatment facility, including a desalination facility, will typically include multiple desalination vessels 102. As noted above, each vessel 102 can include at least one node 116, and the collection of nodes from all vessels collectively forms a node network. The node network is communicatively coupled to a central monitoring station or node sink, which receives and compiles signals from the sensors 112. The node sink can be connected to a computer and can be configured to receive, process, and transmit signals.

Referring to FIG. 3, the components of an exemplary node 116 are shown. Specifically, node 116 includes processor 132, transceiver 134, and impedance analyzer 136, each of which can be communicatively coupled to each other. The impedance analyzer 136 can be any known means for converting a signal to digital data. Impedance analyzer 136 can be an autonomous integrated circuit (as found in the AD5932 from Analog Devices), or it can be replaced by a more complicated circuit consisting of digital-to-analog and analog-to-digital converters in combination with a processor. Impedance analyzer 136 can excite sensors 112 with an electrical signal having a known amplitude and frequency. Computation of the impedance can be performed by comparing the received signal to the transmitted signal. The same impedance analyzer can be used to drive all sensors installed within a pressure vessel in a round robin fashion. For that purpose, suitable multiplexers and de-multiplexers can be used to select the sensor that is being sampled each time. Processor 132 can be configured to receive a signal from impedance analyzer 136, which it correlates to a qualitative measurement of the permeate quality, which in turn is a reflection of the performance of the individual membrane elements 104. Transceiver 134 is configured to communicate wirelessly with node sink 130 directly, or with a wireless router if the distance between the transceiver and the node sink is out, of wireless range. Alternatively, transceiver 134 and node sink 130 can be directly connected.

The elements that make up node 116, which can include processor 132, transceiver 134 and impedance analyzer 136, are preferably positioned on a single printed circuit board, which can have length and width dimensions of less than about 10 cm, and in an exemplary embodiment, can be about 5 cm by 7 cm. Preferably, each printed circuit board that includes the elements of node 116 can have the same design throughout the system, including having the same circuitry.

Referring to FIG. 3, processor 132, transceiver 134, and impedance analyzer 136 can be replaced with other electronic devices depending upon the specific application and the cost associated therewith. Processor 132 and transceiver 134 can optionally be replaced by a single integrated circuit, for example, model CC2430 or CC2530 from Texas Instruments. Similar functionality can be accomplished by using standalone transceiver integrated circuits, such as model CC2420, CC2520 from Texas Instruments, or models AT86RF230, AT86RF231 from Atmel, in combination with low power processor like the model ST8L families from ST, or the model MSP430 families from Texas Instruments. In embodiments where more processing power is required, model STM32W (Cortex-M3 core) low power families from ST can be used as well. In all cases, the processor selected should provide enough flash memory for storing the required communication protocols and the control functions of the impedance analyzer.

Operation of the network of sensors, nodes and the node sink in the water treatment facility can be similar to ad hoc wireless networks. Preferred wireless networks can be based upon IEEE 802.15.4 and Zigbee, or like standards, which can include protocols and mechanisms for the formation, maintenance and operation of an ad-hoc network. In certain embodiments, the network architecture will be based upon a hierarchically oriented network, and in other embodiments can be based upon a mesh-like topology.

Figure 4:
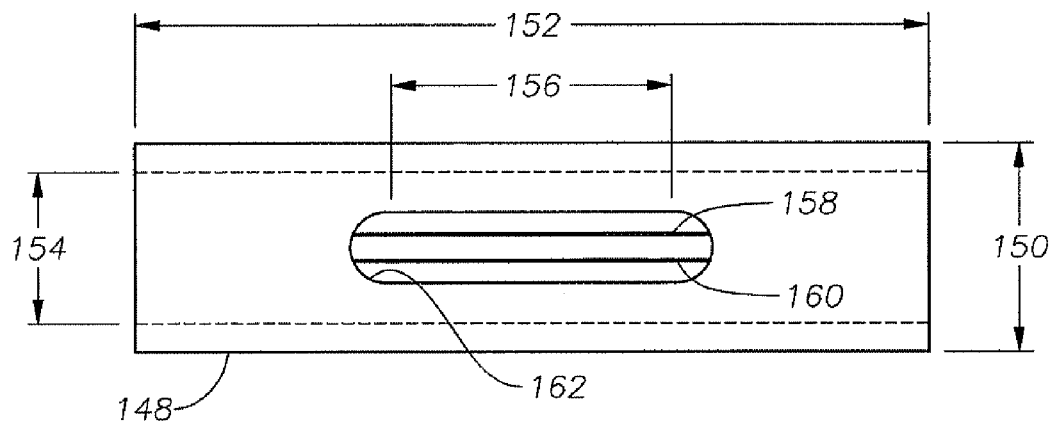
FIG. 4 shows top view of a sensor body according to one embodiment of the present invention.
Figure 5:
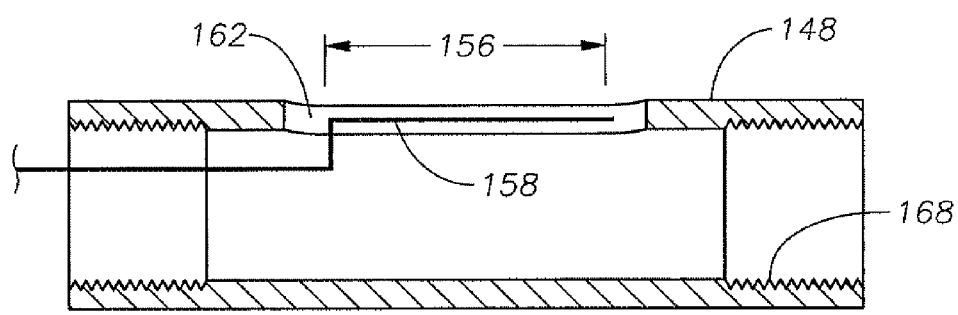
FIG. 5 shows side view of a sensor body according to one embodiment of the present invention.

Referring to FIGS. 4 and 5, views of sensor 112 are provided for monitoring performance of individual membrane elements in a water treatment or desalination operation. Sensor 112 includes sensor body 148, which can be a tubular section having outer diameter 150 that is preferably less than half of the internal diameter of permeate collection tube 106, more preferably less than 30% of the internal diameter of permeate collection tube, and even more preferably 25% or less of the internal diameter of the permeate collection tube. Additionally, outer diameter 150 of sensor body 148 is less than the inner diameter of the inlet fitting 119 to the vessel 102 for installation of probe 110. In a preferred embodiment, the ratio of sensor length 152 to sensor body width or outer diameter (OD) 150 can be between 1:1 and 10:1. In an exemplary embodiment, sensor length 152 is between 40 and 60 mm, sensor width or outer diameter 150 is between 10 and 15 mm, and sensor internal diameter (ID) 154 is between 4 and 10 mm. While probe 114 is generally described herein as being cylindrical, it is understood that other geometries for the probe are possible, including those having triangular, square, rectangular, rhomboidal, trapezoidal, and the like cross-sectional shapes, provided that the selected geometry allows for the sensor body to contact sufficient water to measure a physical property of the water, such as conductivity.

Figure 6:
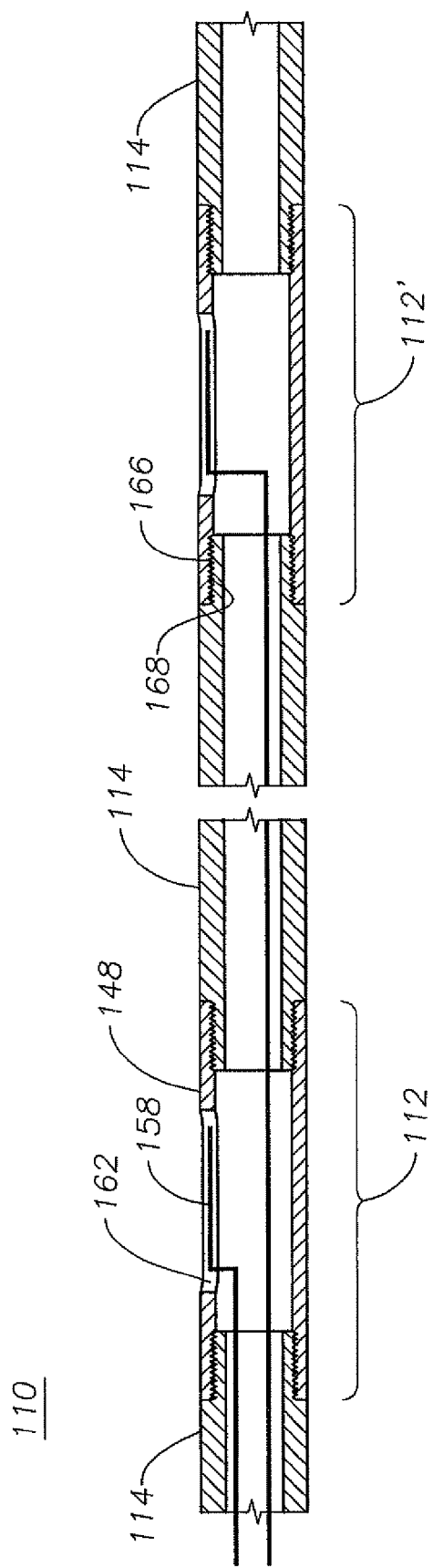
FIG. 6 shows a partial side view of a probe according to one embodiment of the present invention.

Sensor body 148 includes means for being connected to spacing segment or tubular member 114, which functions to separate individual sensors 112 positioned on probe 110 and ensure that individual sensors are properly positioned within permeate collection tube 106. Preferably, spacing segment 114 ensures that each sensor is associated with a single membrane element 104 and ensures that the sensor is positioned in the desired location of each membrane element. Additionally, tubular members 114 can provide rigidity to probe 110. Referring to FIG. 6, the means for connecting the sensor body 148 to tubular member 114 can include threads (e.g., either internal female threads 168 on sensor body 148 adapted to receive corresponding male threads 166 on tubular member 114, or external male threads adapted to couple to corresponding female threads), or other means known in the art. Tubular member 114 can be any known material, preferably a material that is rigid or semi-rigid material, or a material that, at the very least, resists bending or kinking. Exemplary materials for the spacing segment include hollow metal tubes, such as stainless steel, or a rigid plastic or other polymeric material. In certain embodiments, sensor body 148 is a non-conductive material, such as plastic or some other polymer. In certain embodiments, two wires 158, 160 are fixed within the sensor body 148, preferably such that the two wires are positioned parallel to each other. Wires 158, 160 are within well or cavity 162 that has been machined in the sensor body 148. Cavity 162 has a depth 155, in which wires 158, 160 are exposed to the permeate flow. Wires 158, 160 are positioned at some distance 164 from each other, preferably at a distance greater than about 1 mm from each other, more preferably between about 1.5 mm and 3.5 mm from each other, and even more preferably at a distance of between about 1.5 and 2.5 mm from each other. Wires 158, 160 are preferably non-corroding metals, like nickel or chromium alloys. Wires 158, 160 are preferably relatively thin, for example, less than about 500 µm thick. Alternatively, wires 158, 160 have a thickness in the range of about 200 µm to 600 µm (i.e., having a thickness corresponding to AWG 32 to AWG 23). Typical resistance values for AWG 32 to AWG 23 are between about 10 Ω/ft and 1 Ω/ft.

Sensor wires 158, 160 preferably extend continuously from the sensor they are associated with, and through spacing segments 115 toward the outlet 108 of the permeate collection tube 106, thereby becoming the lead wire for transmission of the electronic signal from sensor 112 to node 116. Wires 158, 160 preferably include insulating material disposed on an exterior surface thereof, and are positioned within sensor body 148 and tubular members 114. In certain embodiments, wires 158, 160 may be encased in a waterproof material.

Exemplary probe 110 typically includes between two and ten sensors 112, each connected by tubular members 114, although it is understood that the probe can include more than ten sensors, depending upon the number of membrane elements 104 that are placed within vessel 102. In certain embodiments, the probes 110 are tubular in shape. While probe 110 preferably includes one sensor 112 associated with each membrane element 104, in certain embodiments two or more sensors can be associated with each membrane element. In such embodiments, the second sensor 112' can provide for the measurement of a second physical property, can provide a measurement from a different location in within the length of membrane element 114, or can function as a backup sensor in the event that the primary sensor fails. Wires associated with each individual sensor 112 are housed within tubular members 114 and sensor bodies 118, and extend from each individual sensor, through the tubular members, to node 116 positioned at permeate collection tube outlet 108. Electrical connections are made between each wire associated with each sensor 112 and node 116.

Multiple sensors 112 can be assembled as a part of single probe 110 by mating individual tubular sections such that each section, in one embodiment, includes at least one sensor. In alternate embodiments, each probe 110 may include fewer sensors 112 than the total number of membrane elements 104 present in vessel 102. Preferably, tubular members 114, which have an internal and external diameter that is appropriate for the sensor size, include threaded ends. For example, in certain embodiments, sensors 112 can be positioned within a first tubular member 114, preferably a non-corrosive (e.g., stainless steel) tube, and connected to a second tubular member through a threaded connection. The length of individual tubing members may vary depending upon the length of membrane elements 104 and the overall length of vessel 102 into which probe 110 is installed. In certain embodiments, each tubular member 114 can be between approximately 80 and 120 cm. While the preparation of probe 110 is described to include mating tubular members 114 and sensors 112 by threaded couplings, it is understood that any means for connecting the tubular members and sensors to provide a watertight fitting can be used, including a mechanical or welded fit, or a connection that is chemically prepared, such as with PVC piping. In certain embodiments, a connection that is not permanently joined, such as a threaded connection, may be desired in the event that a sensor fails and requires replacement.

As noted previously, after probe 110 is inserted within permeate collection tube 106, it is secured to permeate outlet 108. Probe 110 can be secured to permeate outlet 108 by any known means, such as by installing a cap (not shown) on the end of the tube that is adapted to secure to both the probe and the permeate outlet. In an exemplary embodiment, the cap can include two internal diameters, a first internal diameter that allows the probe to be secured to the cap and a second internal diameter that allows the cap to be secured to permeate outlet 108.

The lead wires connected to each sensor 112, and which are preferably insulated, are positioned within tubular members 114, and exit and extend from probe 110 at the end where the probe is secured to fitting 119. In certain embodiments, fitting 119 includes probe mount 121, which can be configured such that the lead wires exit therefrom and connect to node 116. The wires exiting probe 110 and water-tight fitting 122 are then connected to node 116. Probe 110 is preferably water tight, thereby minimizing and preferably preventing exposure of the lead wires to fluids. Additionally, probe mount 121 can include means to create a watertight seal with permeate exit 108.

In a preferred embodiment, installation of probe 110 can be as follows. Multiple membrane elements 104 are installed in vessel 102 as per the manufacturer's instructions. Typical membrane elements 104 suitable for use in water treatment and desalination plants include those elements for reverse osmosis and nanofiltration applications, marketed by the manufacturers Hydranautics, Dow Chemical Co. (specifically the Filmtec membrane), Toray, Trisep, and Koch. For the purpose of this invention, the elements of those manufacturers are substantially similar regarding their geometrical configuration and dimensions. Probe 110 can be installed in vessel 102 by a variety of known means, including inserting the probe into permeate collection tube outlet 108. Preferably, probe 110 can be secured to the outlet 108 with water-tight threaded fitting 122. Probe 110 can include a threaded connection at the end of the probe proximate to outlet 108, thereby allowing the probe to be securely attached thereto. Preferably, probe 110 includes means for preparing a water tight seal, such as Teflon coated threads, or other compounds suitable for preparing a water tight seal.

Permeate collection tube 106 includes inner diameter 117 and probe 110 includes outer diameter 150. Probe 110 is positioned within permeate collection tube 106, and preferably has an outer diameter substantially smaller than the inner diameter of permeate collection tube 106. In certain embodiments, inner diameter 117 of permeate collection tube 106 is substantially larger than outer diameter 150 of probe 110. In other embodiments, the ratio of probe outer diameter 150 to permeate collection tube inner diameter 117 is less than about 0.5, preferably less than about 0.4, more preferably less than about 0.3, and even more preferably less than about 0.25. In one exemplary embodiment, a membrane element 104 having an outer diameter of approximately 8 inches, inner diameter 117 of permeate collection tube 106 is about 28 mm and outer diameter 150 of probe 110 is about 7 mm, provides a ratio of outer diameter 150 of probe 110 to inner diameter 117 of permeate collection tube 106 of about 0.25.

The presence of probe 110 in permeate collection tube 106 can restrict the flow of the permeate, thereby effectively creating back pressure in the permeate collection tube. The pressure drop in permeate collection tube 106 as a result of the presence of probe 110 is relatively small, and in certain embodiments may be beneficial; for example, in certain systems that include reverse osmosis separation units. In certain embodiments, at the exit of permeate collection tube 106, a valve (not shown) can be included, which can be used to reduce permeate flow. By reducing permeate flow, a back pressure can be created, for example, pressures of between about 10 and 40 psi. This creation of pressure is known as permeate throttling, which is beneficial as it equilibrates the permeate flow throughout the membrane desalination system.

Removal of one or membrane element 104 can be achieved according to the following steps. After operation of vessel 102 is stopped, the permeate collection tube 106 is allowed to drain any fluids contained therein. Probe 110 is removed by loosening water-tight fitting 122, which is used to secure the probe to probe mount 121 connected to vessel 102, and extracting the probe from permeate collection tube 106. Vessel 102 may then be serviced, which can include removal and replacement of one or more membrane elements 104 or other part of the vessel, as needed. Following the servicing of vessel 102 and the reinstallation of one or more membrane elements 104, probe 110 can be reinserted into the vessel, through permeate outlet 108, and secured to the outlet with water-tight fitting 122. Normal operation of vessel 102 can then resume.

In certain embodiments, probe 110 can include a plurality of centralizers (not shown) designed to maintain the probe in a position substantially central within the permeate collection tube. In certain embodiments, the centralizer can be pliable or retractable to assist with the insertion of a probe that includes the spacer elements into permeate collection tube outlet 108 that includes inner diameter 117 that is less than the outer diameter of the centralizer. Preferably the centralizer does not restrict flow of the permeate within permeate collection tube 106. In preferred embodiments, probe 110 is positioned such that each sensor 112 is positioned near or at the proximate end of the corresponding membrane element 104 it is associated with, wherein the proximate end is relative to the vessel exit 108. The distance between adjacent individual centralizers typically depends upon the overall length of membrane element 104 and vessel 102, and in certain embodiments, can be equal to the distance between sensors 112 on probe 110.

One exemplary method for monitoring the performance of a water treatment apparatus includes the following steps. Water that includes salt, or other dissolved species is injected into a vessel at an injection pressure and is then filtered through a membrane element. The vessel includes a plurality of membrane elements. The permeate collection tube is positioned generally central and axial to the permeate membrane, and is configured to receive a filtered permeate flow through the membrane element. The probe includes at least one sensor per membrane element and is positioned within the permeate collection tube. The plurality of sensors on the probe are configured to measure physical properties of the permeate flow within the permeate collection tube, such as the conductivity, temperature, or pressure of the permeate flow, or other physical or chemical property that can be measured by a small size sensor, such as that which is described herein for conductivity measurements, to evaluate the performance or condition of the respective membrane elements. Each sensor electronically communicates a signal to the node, wherein the signal corresponds to the property measured by the sensor at the membrane element. In certain embodiments, the node includes the processor for processing or transforming the signal received by the node into a processed signal. The signal or processed signal can be then electronically communicated from the node to a communications node or node sink by a transceiver located in the node. Communication can be by known means, such as wireless or radio frequency transmission, or via a physical electrical connection (i.e., hard wired connection). The communications node or node sink is configured to receive electronic signals from a plurality of nodes and, in certain embodiments, can include a computer or like device to record and process the signals. The processed signal can be compared against a predetermined value to qualitatively and quantitatively evaluate the performance of each membrane element. In embodiments wherein the performance of the membrane element is determined to be below desired levels, such as below the predetermined value, individual membrane elements can be scheduled for removal and replacement. In certain embodiments, based upon the signal or processed signal transmitted to the node or node sink, the computer can be configured to transmit a second signal or alert to a central or remote location, wherein the second signal or alert corresponds to an instruction to schedule an individual membrane element for removal and replacement.

In addition to the components described herein, in certain embodiments, the system for monitoring performance of membrane elements in a water filtration or desalination plant can include a computing device selected from one or more networked personal computer, laptop, server, or the like. The computing device can include one or more sets of instructions or programs for controlling the operation of the various probes, sensors and nodes, or for receiving and processing data from the various probes, sensors and nodes, relating to the performance of the various permeate membranes and vessels. The computing device can include computer instruction code, such as for example, Java, C, C++, Visual Basic, and the like. The software code can be stored as a series of instructions or commands on a readable computer medium, including random access memory, read only memory, a magnetic medium, such as for example, a hard drive or floppy disc, an optical medium, or like device. In addition, the computing device can include software operable to provide reports relating to overall system performance, individual membrane element performance, the trend of the individual membrane elements, and suggested replacement of malfunctioning membrane elements.

In certain embodiments, reports can be requested from the computing device from a central or remote location that provide an analysis of the performance of each individual membrane element. The reports can provide a qualitative analysis of a membrane element, indicating whether sufficient amounts of salts and other dissolved species are being removed, or alternatively, the reports can provide quantitative analysis, such as the concentration of salt in the permeate flow, of the membrane element. In certain embodiments, historical data for the performance of a membrane element can be recorded and compared against current performance. In alternate embodiments, the system can be configured to automatically provide reports on a predetermined basis, such as daily, weekly or monthly. In yet other embodiments, the system can communicate the need to replace a membrane element, or the anticipated need to replace a membrane element, to an operator. The communication can be a visual indicator, such as a light, flag, or the like, or can be a message that is sent from a computer to an operator, such as via email indicating the need for servicing the system.

In certain embodiments, the computer can be programmed to communicate with a powered valve that is coupled to the vessel such that water flow to the vessel can be reduced or halted upon the determination or indication that at least one membrane element within the vessel is operating below acceptable standards.

In one embodiment, a system for evaluating membrane element performance in a water treatment facility, including a desalination plant, is provided. The step of evaluating membrane performance can include determining whether the membrane element is in need of replacement, remaining operable lifetime of the membrane element, or providing a qualitative or quantitative measure of the quality of a permeate flow through the membrane element. The system includes at least one vessel, the vessel including a plurality of membrane elements, a permeate collection tube positioned within the plurality membrane element and a probe positioned within the permeate collection tube. The permeate collection tube being operable to receive a filtered permeate flow through the membrane element. The probe includes at least one sensor positioned adjacent to at least one membrane element, wherein the at least one sensor being operable to measure the conductivity of the filtered permeate flow exiting from a corresponding membrane element to which it is adjacent. The sensor is also operable to communicate a signal corresponding to the conductivity of the permeate flow to a vessel node. The vessel node is configured to receive and process said signal from the at least one sensor to produce a processed signal. The step of processing the signal can include normalizing and/or correcting the conductivity value, and can include the step of correlating the conductivity value to a specific sensor, membrane element, and/or vessel. The system further includes a communication node wirelessly or electronically coupled to the vessel node, wherein the communications node is operable to receive the processed signal from the node and operable to transmit the processed signal.

The system also includes a first computer configured to receive the processed signal from the communication node, wherein the processed signal corresponds to the conductivity or other measurement taken at a specific membrane element. The system also includes a computer program that is associated with the computer and stored on a tangible computer memory media. The computer program is operable on the computer, the computer program including a set of instructions that, when executed by the computer, cause the computer to perform a set of operations. The operations performed by the computer include receiving the processed signal from the communication node associated with the vessel, where the processed signal corresponds to the measured conductivity or other measured property of the permeate flow (such as temperature or pressure), and determining, by the computer responsive to receiving the processed signal, whether the processed signal is different than a predetermined value. The predetermined value corresponds to a threshold performance level of the membrane element, wherein a processed signal value that is different than the predetermined value indicates a need to replace the membrane element; the signal identifying the location of the sensor and the associated membrane element from which the permeate flow is measured. For example, an increase in the conductivity of the permeate flow can be indicative of an increase in the salt content of the permeate flow and a need to replace the corresponding membrane element. The operation further includes communicating a need to replace the membrane element, by the computer to an operator of the water treatment facility.

In certain embodiments, the system further includes the step of comparing, by the computer, the processed signal to a predetermined value and determining, by the computer, whether the processed signal is indicative of a need to replace a membrane element.

In another embodiment, a computer program product stored on a tangible computer memory media, and operable on a computer, is provided. The computer program product includes a set of instructions that, when executed by the computer, cause the computer to perform the following operations. The computer receives a signal from a communication node in a water treatment facility that includes a plurality of vessels, such as water treatment vessel. Each vessel includes a plurality of membrane elements and a permeate collection tube located within said plurality of membrane elements. The permeate collection tube is operable to receive a filtered permeate flow, and includes a probe positioned therein. The probe includes at least one sensor positioned adjacent to each of the plurality of membrane elements, which is configured to measure a physical property, such as conductivity, of the permeate flow at the sensor location. Responsive to the receipt of the signal by the computer, the computer program determines if the signal is greater than a predetermined value, wherein the predetermined value is a threshold measure of the point at which the membrane element is in need of replacement. Responsive to a determination by the computer that the signal is different than the predetermined value, the computer program communicates to an operator at the water treatment facility that a membrane element in a water treatment facility needs to be replaced.

In certain embodiments, the step of communicating the need to replace a membrane element in the water treatment facility to an operator can include sending an electronic notification to said operator, wherein the electronic communication can be an email or text message. In certain embodiments, the communication can be a voice mail. In alternate embodiments, the vessel may include a visual indicator that the membrane needs replacement.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

The present invention may suitably comprise, consist of, or consist essentially of the elements disclosed and may be, in certain embodiments, practiced in the absence of an element not disclosed.

That which is claimed is:

1. A system for monitoring performance of membranes elements in a water treatment facility comprising:
   at least one vessel, the vessel comprising a plurality of membrane elements, said plurality of membrane elements being operable to remove salt or other dissolved species from a water source that includes salt or other dissolved species to produce a permeate flow comprising filtered water, said membrane element comprising a filter medium and a permeate collection tube positioned in the membrane element, the permeate collection tube operable for receiving the permeate flow and comprising a permeate outlet;
   a water tight probe installed within the permeate collection tube and operable to measure at least one physical property of the permeate, the probe comprising a plurality of sensors such that at least one sensor is positioned within the permeate collection tube adjacent to each membrane element,
   wherein each sensor comprises
      a sensor body, the sensor body defining a cavity in the sensor body; and
      a plurality of wires configured to transmit a signal, the plurality of wires being housed within the sensor body, at least two wires extending into the cavity for each sensor, the at least two wires being fixed within the cavity at a distance from each other such that the cavity is configured to expose the plurality of wires fixed within the cavity to the permeate flow;
   at least one node operable to receive the signal from the plurality of wires from said plurality of sensors corresponding to a pre-selected physical property of the permeate flow, the plurality of wires extending continuously from the sensor body to form an electrical connection to the at least one node through the plurality of sensors; and
   a communications node configured to receive the signal from the at least one node, the communications node configured to process and compare the signal against a pre-determined value indicating the performance of a membrane element.

2. The system of claim 1 wherein the node comprises at least one of a processor, impedance analyzer, and a transceiver.

3. The system of claim 1 wherein the node is positioned external to the vessel.

4. The system of claim 1 wherein the ratio of the outer diameter of the probe to the inner diameter of the permeate collection tube is less than about 0.3.

5. The system of claim 1 further comprising a fitting coupled to the permeate outlet of the permeate collection tube, said fitting comprising a removable water-tight fitting adapted to allow for the insertion and removal of the probe from the vessel.

6. The system of claim 1 wherein the physical property of the permeate flow measured by the sensor is selected from conductivity, temperature and pressure.

7. The system of claim 1 wherein the physical property of the permeate flow measured by the sensor is the conductivity.

8. The system of claim 1 further comprising measuring the flow rate of the permeate.

9. The system of claim 1 wherein the probe further comprises at least one sensor per membrane element present in the vessel, wherein each sensor is configured to measure the conductivity of the permeate flow at the membrane element.

10. The system of claim 1 further comprising wirelessly communicating the processed signal from the node to the node sink.

11. A method for monitoring performance of a membrane element in a water treatment facility using the system of claim 1, comprising the steps of:
   injecting water containing salt or other dissolved species into a vessel at an injection pressure, said vessel comprising at least one membrane element and a permeate collection tube positioned within said membrane element, said permeate collection tube adapted to receive a filtered permeate flow through said membrane element;
   measuring a property of the permeate flow in the membrane element with a sensor to produce an electronic signal, wherein at least one sensor is positioned adjacent to the membrane element such that at least one sensor contacts the permeate flow exiting the membrane element and measures the property of the permeate flow, wherein the property is selected from conductivity and temperature;

communicating an electronic signal from the sensor to a node, said electronic signal including information corresponding to the location of the sensor within the vessel, said node processing the electronic signal from the sensor to provide a processed signal;

communicating the processed signal from the node to a node sink; and receiving the processed signal by the node sink, said node sink being operable to receive processed signals from a plurality of nodes corresponding to the performance of associated membrane elements.

12. The method of claim 11 further comprising the step of evaluating the performance of the membrane element, wherein evaluating the performance of the membrane element comprises receiving the processed signal from the node and comparing the processed signal with a predetermined value to determine if the membrane element is producing a permeate of desired quality.

13. The method of claim 11 further comprising comparing the processed signal to historical data for each individual membrane element to determine a predicted interval for replacement.

14. The method of claim 12 further comprising communicating a need to replace one or more membrane elements upon the condition of the processed signal corresponding to the conductivity of the permeate being greater than the predetermined value.

15. The method of claim 11, further comprising electrically communicating the processed signal from the node to the node sink.

16. The method of claim 11, further comprising wirelessly communicating the processed signal from the node to the node sink.

17. A system for determining and evaluating membrane element performance in a water treatment facility, the system comprising:
    at least one vessel comprising:
    a plurality of membrane elements;
    a permeate collection tube positioned within the plurality membrane element, said permeate collection tube being operable to receive a filtered permeate flow through the membrane element;
    a water tight probe installed within the permeate collection tube, said probe comprising a plurality of sensors, such that at least one sensor is positioned adjacent to each membrane element,
        wherein each sensor comprises
        a sensor body, the sensor body defining a cavity in the sensor body; and
        a plurality of wires configured to transmit a signal, the plurality of wires being housed within the sensor body, at least two wires extending into the cavity for each sensor, the at least two wires being fixed within the cavity at a distance from each other such that the cavity is configured to expose the plurality of wires fixed within the cavity to the permeate flow;
        said plurality of sensors being operable to measure a physical property of the filtered permeate flow exiting from a corresponding membrane element to which each at least one sensor is adjacent and communicate the signal corresponding to said physical property to the vessel node, wherein said vessel node is configured to receive and process said signal from the plurality of wires from the plurality of sensors to produce a processed signal, wherein the physical property is selected from the group consisting of conductivity, temperature, and pressure, the plurality of wires extending continuously from the sensor body to form an electrical connection to the at least one node through the plurality of sensors;
    a communication node electronically coupled to the vessel node, said communications node being operable to receive a processed signal from the plurality of sensors and operable to transmit the processed signal;
    a computer configured to receive the processed signal from the communication node, said processed signal corresponding to the physical property measurement taken at a specific membrane element;
    a computer program associated with the computer, stored on a tangible computer memory media and operable on a computer, the computer program product comprising a set of instructions that, when executed by the computer, cause the computer to perform the operations of:
        receiving, by the computer, the processed signal from the communication node associated with a vessel, said processed signal corresponding to the physical property of the filtered permeate flow;
        determining, by the computer responsive to the receipt of the processed signal, whether the processed signal is different than a predetermined value, wherein the predetermined value corresponds to a threshold performance level of the membrane element, wherein a processed signal value that is different than the predetermined value indicates a need to replace the membrane element, said signal identifying the location of the sensor and the associated membrane element from which the permeate flow is measured; and
        communicating, by the computer to an operator of the water treatment facility, a need to replace the membrane element.

18. The system of claim 17 further comprising comparing, by the computer, the processed signal to a predetermined value and determining, by the computer, whether the processed signal is indicative of a need to replace a membrane element.

19. A system for monitoring performance of membranes elements in a water treatment facility comprising:
    at least one vessel, the vessel comprising a plurality of membrane elements, said plurality of membrane elements being operable to remove salt or other dissolved species from a water source that includes salt or other dissolved species to produce a permeate flow comprising filtered water, said membrane element comprising a filter medium and a permeate collection tube positioned in the membrane element, the permeate collection tube operable for receiving the permeate flow and comprising a permeate outlet;
    a water tight probe installed within the permeate collection tube and operable to measure at least one physical property of the permeate, the probe comprising a plurality of sensors such that at least one sensor is positioned within the permeate collection tube adjacent to each membrane element,
        wherein each sensor comprises
        a sensor body, the sensor body defining a cavity in the sensor body; and
        a plurality of wires configured to transmit a signal, the plurality of wires being housed within the sensor body, at least two wires extending into the cavity for each sensor, the at least two wires being fixed within the cavity at a distance from each other such that the cavity is configured to expose the plurality of wires fixed within the cavity to the permeate flow;

at least one node operable to receive the signal from the plurality of wires from said plurality of sensors corresponding to a pre-selected physical property of the permeate flow, the plurality of wires extending continuously from the sensor body to form an electrical connection to the at least one node through the plurality of sensors;

a communications node configured to receive the signal from the at least one node, the communications node configured to process and compare the signal against a pre-determined value indicating the performance of a membrane element; and a fitting coupled to the permeate outlet of the permeate collection tube, said fitting comprising a removable water-tight fitting adapted to allow for the insertion and removal of the probe from the vessel.

* * * * *